(12) United States Patent
Leen

(10) Patent No.: US 6,814,175 B2
(45) Date of Patent: Nov. 9, 2004

(54) BENT TORQUE ROD

(76) Inventor: John Leen, 2411 Walker Rd., Carsonville, MI (US) 48419

( * ) Notice: Subject to any disclaimer, the term of this patent is extended or adjusted under 35 U.S.C. 154(b) by 0 days.

(21) Appl. No.: 10/636,875

(22) Filed: Aug. 7, 2003

(65) Prior Publication Data

US 2004/0026888 A1 Feb. 12, 2004

Related U.S. Application Data

(63) Continuation of application No. 09/521,521, filed on Mar. 8, 2000, now abandoned.

(51) Int. Cl.[7] .............................................. B60K 17/00
(52) U.S. Cl. ..................................................... 180/349
(58) Field of Search ....................... 280/5.511, 124.106, 280/124.107, 124.128, 124.166; 180/349, 352, 378

(56) References Cited

U.S. PATENT DOCUMENTS

| | | | |
|---|---|---|---|
| 2,300,844 A | * 11/1942 | Olley ........................ 180/349 |
| 2,746,766 A | * 5/1956 | Nallinger ............. 280/124.179 |
| 3,084,952 A | 4/1963 | Freitas et al. ................ 280/112 |
| 3,194,336 A | * 7/1965 | McHenry .................... 180/352 |
| 3,306,639 A | 2/1967 | Lyon ........................... 287/58 |
| 3,313,369 A | 4/1967 | Whitehead ................... 180/22 |
| 3,406,983 A | 10/1968 | Masser ....................... 280/124 |
| 3,410,575 A | 11/1968 | Turnbull et al. ............ 280/124 |
| 3,572,745 A | 3/1971 | Willetts .................... 280/104.5 |
| 3,704,897 A | 12/1972 | Bagge et al. ................. 280/91 |
| 3,792,871 A | 2/1974 | Chalmers ............. 280/104.5 A |
| 3,871,677 A | 3/1975 | Blank et al. .......... 280/104.5 A |
| 3,895,819 A | 7/1975 | Willetts ................... 280/124 R |
| 4,033,606 A | 7/1977 | Ward et al. ................. 280/682 |
| 4,108,470 A | 8/1978 | Vinton ........................ 280/677 |
| 4,120,515 A | 10/1978 | Vinton ........................ 280/678 |
| 4,132,433 A | 1/1979 | Willetts ...................... 280/712 |
| 4,146,340 A | 3/1979 | Smith, Jr. .................... 403/27 |
| 4,189,249 A | 2/1980 | Gaines et al. ................. 403/27 |
| 4,245,852 A | 1/1981 | Lie et al. ..................... 280/680 |
| 4,309,045 A | 1/1982 | Raidel ......................... 280/711 |
| RE31,013 E | 8/1982 | Smith, Jr. .................... 403/27 |
| 4,344,642 A | 8/1982 | Goth .......................... 280/682 |
| 4,359,122 A | 11/1982 | Albee .......................... 180/74 |

(List continued on next page.)

FOREIGN PATENT DOCUMENTS

| EP | 0 407 075 A2 | 1/1991 | |
|---|---|---|---|
| EP | 407075 A2 * | 1/1991 | ........... B60G/21/02 |
| EP | 512358 A1 * | 11/1992 | ......... B60G/21/055 |
| WO | WO 90/15727 | 12/1990 | |
| WO | WO 9015727 A1 * | 12/1990 | ........... B60G/21/04 |

Primary Examiner—Lesley D. Morris
Assistant Examiner—Paul Royal, Jr.
(74) Attorney, Agent, or Firm—Gifford, Krass, Groh, Sprinkle, Anderson & Citkowski, P.C.

(57) ABSTRACT

A torque rod assembly for use in a vehicle suspension system, the torque rod assembly comprising a torque rod, which is preferably V-shaped. The torque rod has a first arm portion and a second arm portion, each arm portion having an end. A bend portion is disposed between the first and second arm portions, the arm portions being disposed at an angle with respect to each other. The bend portion, disposed between the first and second arm portions, is pivotably mounted to an axle. The ends of the torque rod are pivotably mounted to the vehicle frame.

15 Claims, 2 Drawing Sheets

U.S. PATENT DOCUMENTS

| | | | | |
|---|---|---|---|---|
| 4,371,189 A | 2/1983 | Raidel | | 280/682 |
| 4,383,703 A | 5/1983 | Honda et al. | | 280/682 |
| 4,400,009 A | 8/1983 | Raidel | | 280/687 |
| 4,406,479 A | 9/1983 | Chalmers | | 280/678 |
| 4,486,029 A | 12/1984 | Raidel | | 280/682 |
| 4,502,707 A | 3/1985 | Jable et al. | | 280/682 |
| 4,575,058 A | 3/1986 | Daraz | | 267/70 |
| 4,616,387 A | 10/1986 | Smith, Jr. | | 29/149.5 B |
| 4,714,269 A | 12/1987 | Raidel | | 280/683 |
| 4,718,779 A | 1/1988 | Trudeau | | 384/206 |
| 4,718,780 A | 1/1988 | Trudeau | | 384/206 |
| 4,750,757 A | 6/1988 | Long | | 280/689 |
| 4,756,550 A | 7/1988 | Raidel | | 280/713 |
| 4,761,083 A | 8/1988 | Smith et al. | | 384/208 |
| 4,802,690 A | 2/1989 | Raidel | | 280/713 |
| 4,858,948 A | 8/1989 | Raidel | | 280/711 |
| 4,888,236 A | 12/1989 | Trudeau | | 428/34.1 |
| 4,900,057 A | 2/1990 | Raidel | | 280/713 |
| 4,902,035 A | 2/1990 | Raidel | | 280/713 |
| 5,037,125 A | * 8/1991 | Zamitter et al. | | 280/686 |
| 5,255,754 A | * 10/1993 | Lauronen | | 180/24.01 |
| 5,281,033 A | * 1/1994 | Ide | | 384/213 |
| 5,366,035 A | * 11/1994 | Hayashida et al. | | 180/24.01 |
| 5,458,359 A | * 10/1995 | Brandt | | 280/124.111 |
| 5,492,351 A | * 2/1996 | Salo | | 280/81.6 |
| 5,505,481 A | 4/1996 | VanDenberg et al. | | 280/704 |
| 5,549,320 A | 8/1996 | Ellingsen | | 280/689 |
| 5,564,521 A | * 10/1996 | McLaughlin et al. | | 180/352 |
| 5,711,544 A | * 1/1998 | Buhl | | 280/124.116 |
| 6,267,526 B1 | * 7/2001 | McLaughlin | | 403/150 |
| 6,270,282 B1 | * 8/2001 | McLaughlin | | 403/158 |
| 6,439,588 B1 | * 8/2002 | Svensson | | 280/124.116 |

\* cited by examiner

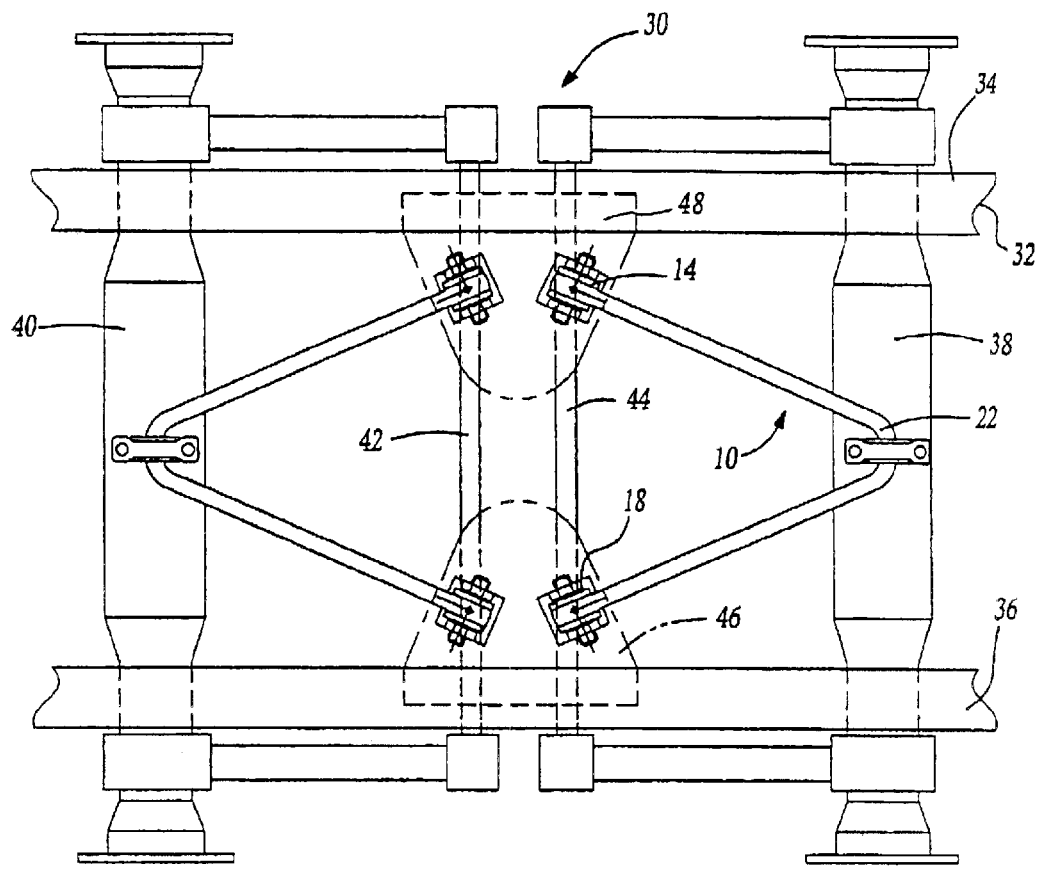
Fig-1
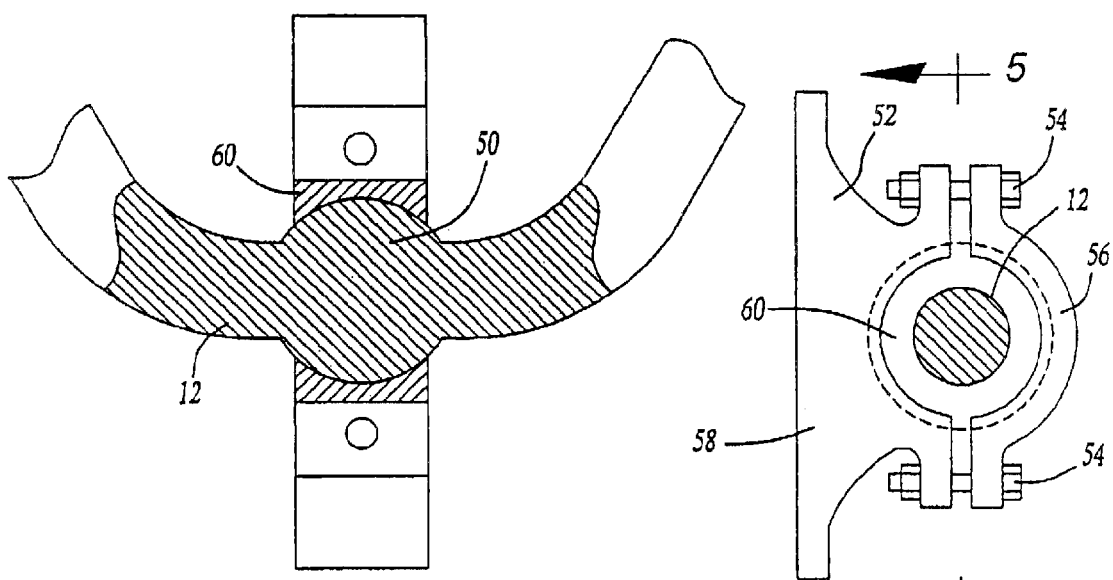
Fig-5
Fig-4

BENT TORQUE ROD

RELATED APPLICATION

This application is a continuation of U.S. patent application Ser. No. 09/521,521 filed Mar. 8, 2000 now abandoned.

FIELD OF THE INVENTION

The present invention relates generally to torque rods, and more particularly to a bent torque rod.

BACKGROUND OF THE INVENTION

Torque rods are utilized in vehicle suspension systems to absorb the high stresses generated during vehicle acceleration and deceleration. Most conventional torque rods are straight and are utilized in pairs, one pair of torque rods connecting an axle to the vehicle frame. The utilization of such straight paired torque rods is described in U.S. Pat. No. 5,549,320. Each torque rod is typically attached at a first end to the axle and at a second end to a cross-member extending between the rails of the vehicle's frame. The first ends of the torque rods which are mounted to the axle are positioned proximate to each other, the torque rods extending outwardly therefrom and away from each other, the second ends of the torque rods mounted to the vehicle frame being spaced apart from each other. The position of the torque rods is key to the proper alignment of the vehicle's wheels. As the suspension system is subjected to use, repeated adjustment of the torque rods is required.

Although there are a wide variety of torque rods available for use in a vehicle, such torque rods are intended for use in pairs. These conventional torque rods must be installed and adjusted individually, requiring a significant amount of labor. Thus there remains a need for a torque rod which minimizes the costs associated with installation and maintenance.

SUMMARY OF THE INVENTION

The present invention relates to a torque rod assembly for use in a vehicle suspension system, the torque rod assembly comprising a torque rod having two ends, and a bend portion disposed between ends. The torque rod has a first and second arm portion which are preferably disposed at an angle with respect to each other. The bend portion of the torque rod may be pivotably mounted to a vehicle axle by a variety of means. In the preferred embodiment, a bracket assembly is positioned about the bend portion of the torque rod. The bracket assembly is operative to mechanically couple the torque rod to the axle and permit the torque rod to pivot with respect to the axle about the bend portion. The bracket assembly preferably comprises a bearing ring which is mechanically connected to the bend portion of the torque rod. An outer bracket, mounted about the bearing ring, pivotably engages the bearing ring to permit the bearing ring and the torque rod to pivot within the outer bracket. The outer bracket is mechanically coupled to the axle by bolts, screws, welding or the like. Alternately, a ball joint may be formed about the torque rod at the bend portion. In such an embodiment, the ball joint is pivotably mounted to the axle by any of a variety of available bearings. The ends of the torque rod are pivotably connected to the vehicle frame. In the preferred embodiment, the torque rod ends are pivotably mounted to a cross-member which extends between the parallel frame rails of the vehicle.

In the preferred embodiment, the torque rod is V-shaped or U-shaped. Although the angle between the two arm portions may vary widely, the angle preferably ranges between forty degrees and sixty degrees, although angles of more than sixty or less than forty degrees may be utilized. In the most preferred embodiment, the angle between the first arm portion and the second arm portion is 55 degrees.

Other objects, advantages and applications of the present invention will be made clear by the following detailed description of a preferred embodiment of the invention. The description makes reference to drawings in which:

BRIEF DESCRIPTION OF THE DRAWINGS

FIG. 1 is a plan view of a vehicle suspension system;

FIG. 4 is a view of an alternate embodiment of the bearing assembly; and

FIG. 5 is a cross-sectional view of the bearing assembly shown in FIG. 4 taken along lines 5—5.

DETAILED DESCRIPTION

Figure 2:
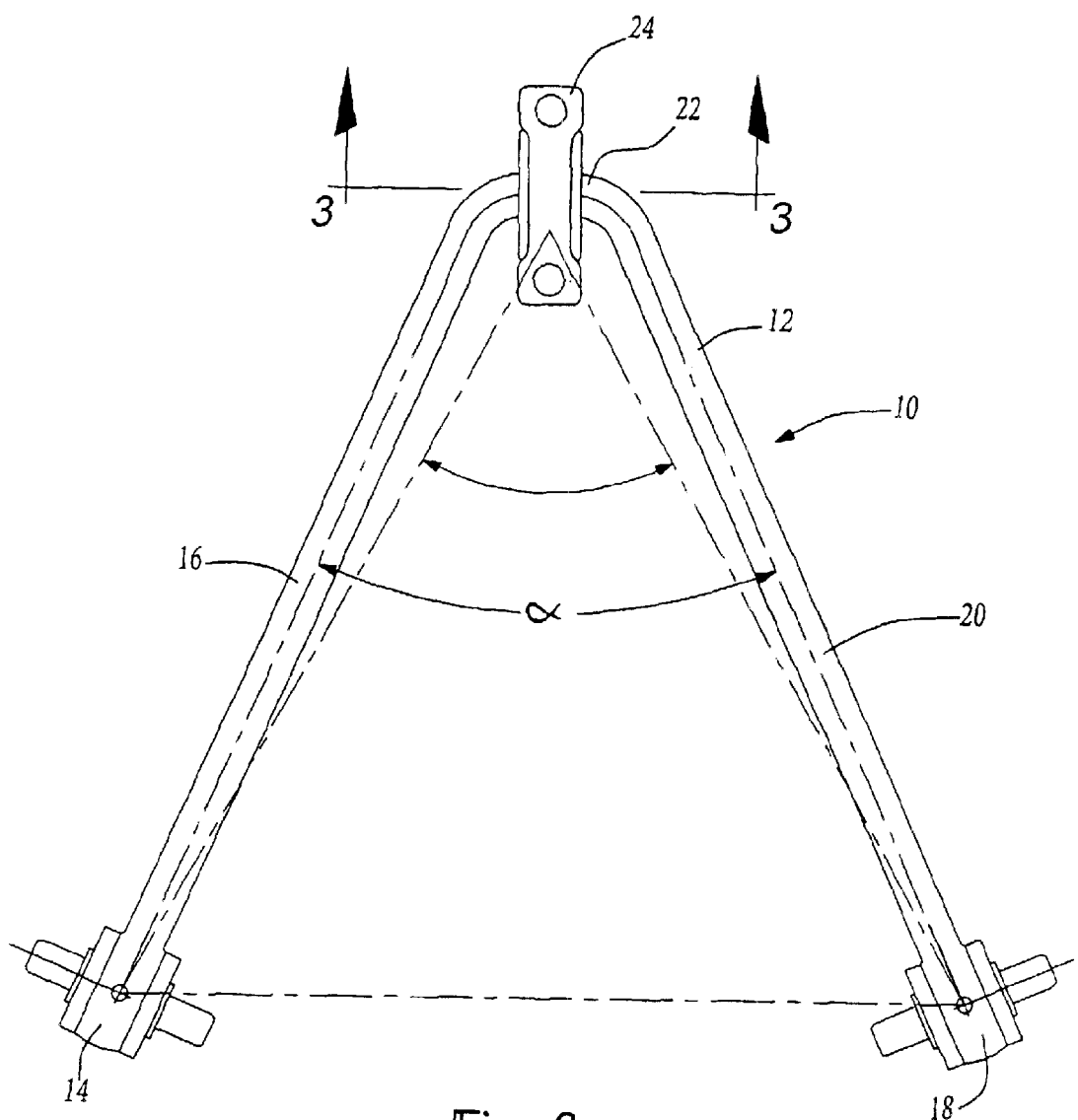
FIG. 2 is a view of the torque rod assembly utilized in the vehicle suspension system shown in FIG. 1.

The present invention is a torque rod assembly for use in a vehicle suspension system. As shown in FIG. 1, a vehicle suspension system 30 comprises a vehicle frame 32 having a first frame rail 34 and a second frame rail 36. Two axles 38, 40 are provided. Two cross-members 42, 44 are provided, the cross-members extending between the first frame rail 34 and second frame rail 36. The cross-members 42, 44 are mechanically mounted to the vehicle frame 32 in a conventional manner.

The present invention is a torque rod assembly for use in such a vehicle suspension system, the torque rod assembly 10 being shown in FIGS. 1 and 2. The torque rod assembly 10 shown therein comprises a torque rod 12 which, in preferred embodiments, is V-shaped or U-shaped. The torque rod 12 has a first arm portion 16 and a second arm portion 20. A bend at portion 22 is disposed between the first arm portion 16 and the second arm portion 20. The first arm portion 16 terminates in a first end 14 the second arm portion 20 terminates in a second end 18 eighteen. The ends 14, 18, are pivotably mounted to the cross-member 42 or 44. In the preferred embodiment as shown in FIG. 1, the ends 14, 18 are pivotably mounted to plates 48, and 46 respectively. Plate 46 is mounted to the second frame rail, the plate 48 is mounted to the first frame rail by conventional methods. The ends 14 and 18 of the torque rod 12 may be pivotably mounted to the frame of the vehicle in a variety of ways.

As shown in FIG. 1, a vehicle having two axles utilizes two torque rods of the present invention. As both torque rods are mounted in the suspension system 30 of the vehicle, only one torque rod assembly will be described in detail.

Figure 3:
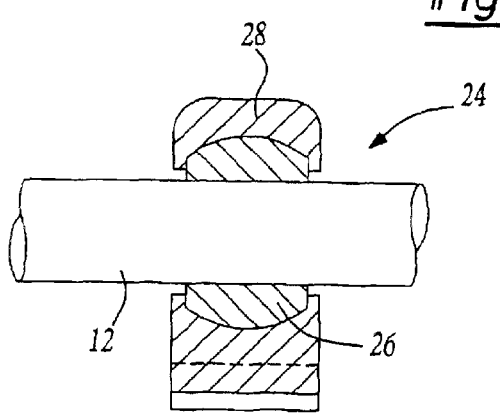
FIG. 3 is a cross-sectional view of the bearing assembly shown in FIG. 2 taken along lines 3—3.

As shown in FIG. 1, the bent portion 22 of the torque rod is pivotably mounted to the axle 38. The bent portion 22 may be mounted thereto by a variety of ways. Preferably, the torque rod 12 is mounted thereto by a bracket assembly 24, which is depicted in FIG. 3. The bracket assembly 24 includes an inner portion or bearing ring 26, which is mechanically connected to the bent portion of the torque rod. An outer bracket or outer portion 28 which pivotably engages the bearing ring so as to permit the bearing ring and the torque rod to pivot within the outer portion, is mechanically coupled to the axle. The outer portion may be mechanically coupled to the axle by a variety of means, such as bolting, welding and the like.

The bent portion of the torque rod is pivotably mounted to the axle via a bracket assembly, the bracket assembly being operative to mechanically couple the torque rod to the axle and permit the torque rod to pivot with respect to the axle about the bent portion.

In an alternate embodiment the inner portion is, a ball joint 50 as shown in FIG. 5, which may be integrally formed with the torque rod 12 or mechanically connected to the torque rod 12 and the bend portion. The outer portion is a bearing assembly 52 that is utilized to pivotably mount the torque rod 12 and ball joint 50 to the axle 38. As depicted in FIG. 4, the bearing assembly 52 preferably includes a lower portion 58 and an upper portion 56. The upper portion 56 and lower portion 58 are mechanically connected to each other via a pair of bolts 54. The lower portion 58 and upper portion 56 of the bearing assembly 52 are formed so that a circular bearing 60 may be held between the upper portion 56 and lower portion 58 of the bearing assembly 52. The bearing 60 is configured so that the ball joint 50 will fit within the interior cavity of the bearing, the ball 50 free to pivot within the interior cavity of the bearing 60. With the ball joint 50 pivotably enclosed within bearing 60 and bearing 60 mounted between the lower portion 58 and upper portion 56 of the bearing assembly 52, the bend portion 22 of the torque rod 12 may be pivotably mounted to the axle 38 by mechanically connecting the lower portion 58 of the bearing assembly 52 to the axle 38. The lower portion 58 may be mechanically connected by a variety of means to the bracket assembly.

In the preferred embodiment, the first arm portion 16 and second arm portion 20 are disposed at an angle a with respect to each other, as shown in FIG. 2. In the preferred embodiment, the angle a ranges between forty degrees and sixty degrees, although angles less than forty degrees and greater than sixty degrees may be utilized in the present invention. Most preferably, the angle a is approximately 55 degrees.

Having described the various embodiments of the present invention with reference to the accompanying figures, it will be appreciated that various changes and modifications can be made without departing from the scope or spirit of the invention.

I claim:

1. A combination torque rod and vehicle axle assembly comprising:
   a vehicle frame including at least one longitudinal frame rail and one transverse cross member;
   a vehicle axle mounted to the vehicle frame such that the axle is generally parallel to the transverse cross member;
   a torque rod, the torque rod being a single elongated shaft having a first end, a second end and a midportion extending between the first and second ends, the midportion including a bend portion, the midportion having a generally constant cross section throughout its length, the first and second a ends being mounted to the vehicle frame, the bend portion being formed by bending the first end of the shaft toward the second end to form a substantially V or U shaped torque rod; and
   a bracket assembly pivotally interconnecting the bend portion of the torque rod to the vehicle a axle such that the bend pardon is pivotable about a generally horizontal transverse axis, the bracket assembly having an inner portion mechanically coupled to the bend portion of the torque rod and an outer portion solidly interconnected with the vehicle axle, the inner and outer portions being pivotally coupled.

2. The combination according to claim 1, wherein the inner portion of the bracket assembly is generally ball-shaped and the outer portion at least partially surrounds the ball-shaped inner portion.

3. The combination according to claim 2, wherein the ball-shaped inner portion is integrally formed with the bend portion of the torque rod.

4. The combination according to claim 1, wherein the inner portion of the bracket assembly comprises a bearing ring mechanically connected to the bend portion of the torque rod and the outer portion engages the bearing ring so as to permit the bearing ring and the torque rod to pivot within the outer portion.

5. The combination according to claim 1, wherein the first and second ends of the torque rod are mounted to the frame by pivotal mounts.

6. The combination according to claim 1, wherein the torque rod has a first arm portion defined between the bend portion and the first end and a second arm portion defined between the bend portion and the second end, an angle being defined between the first and second arm portions with the angle being between 40 and 60 degrees.

7. The combination according to claim 6, wherein the angle is approximately 55 degrees.

8. The combination according to claim 1, wherein the frame includes a pair of frame rails, the combination further comprising a pair of plates, one of the plates mounted to each of the a frame rails, the first end of the torque rod interconnected with one of the plates and the second end of the torque rod interconnected with the other of the plates.

9. A combination torque rod and vehicle axle assembly comprising:
   a vehicle frame having a pair of longitudinal rails and a pair of transverse cross members;
   a pair of plates, each plate of die pair of plates being secured to the frame;
   a pair of vehicle axles mounted to the vehicle frame such that each of the axles can only move generally vertically with respect to the frame;
   first and second torque rods, each of the torque rods being a single elongated shaft having a first end, a second end and a midportion extending between the first and second ends, the midportion including a bend portion formed by bending the first end of the shaft toward the second end to form a substantially V or U shaped torque rod, the midportion having a generally constant cross section throughout its length, the first ends of the torque rods being mounted to one of the plates and the second ends of the torque rods being mounted to the other plate;
   a pair of bracket assemblies, each bracket assembly pivotally interconnecting the bend portion of one of the torque rods to one of the vehicle axles such that the bend portion is pivotable about a generally horizontal transverse axis, the bracket assembly having an inner portion mechanically coupled to the bend portion of the torque rod and an outer portion solidly interconnected with the vehicle axle, the inner and outer portions being pivotally coupled.

10. The combination according to claim 9, wherein the inner portion of each bracket assembly is generally ball-shaped and the outer portion at least partially surrounds the ball-shaped inner portion.

11. The combination according to claim 10, wherein the ball-shaped inner portion is integrally formed with the bend portion of the torque rod.

12. The combination according to claim 9, wherein the inner portion of each bracket assembly comprises a bearing ring mechanically connected to the bend portion of the torque rod and the outer portion engages the bearing ring so as to permit the bearing ring and the torque rod to pivot within the outer portion.

13. The combination according to claim 9, wherein the first and second ends of the a torque rods are mounted to the plates by pivotal mounts.

14. The combination according to claim 9, wherein each torque rod has a first arm portion defined between the bend portion and the first end and a second arm portion defined between the bend portion and the second end, an angle being defined between the first and second arm portions with the angle being between 40 and 60 degrees.

15. The combination according to claim 14, wherein the angle is approximately 55 degrees.

\* \* \* \* \*